(12) United States Patent
Zhang et al.

(10) Patent No.: US 11,000,957 B2
(45) Date of Patent: May 11, 2021

(54) MECHANICAL HAND OF DUAL-DRIVEN SPECIAL-SHAPED SUPER-FLEXIBLE ELASTIC FRAMEWORK

(71) Applicant: Jiangnan University, Wuxi (CN)

(72) Inventors: Jun Zhang, Wuxi (CN); Dingfeng Xu, Wuxi (CN); Qiang Wang, Wuxi (CN); Bing Lv, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 0 days.

(21) Appl. No.: 17/117,572

(22) Filed: Dec. 10, 2020

(65) Prior Publication Data

US 2021/0094189 A1    Apr. 1, 2021

Related U.S. Application Data

(63) Continuation of application No. PCT/CN2019/104268, filed on Sep. 4, 2019.

(30) Foreign Application Priority Data

Sep. 7, 2018 (CN) .......................... 201811041675.5

(51) Int. Cl.
*B25J 15/02* (2006.01)
*B25J 15/12* (2006.01)

(52) U.S. Cl.
CPC ............. *B25J 15/022* (2013.01); *B25J 15/12* (2013.01)

(58) Field of Classification Search
CPC ................................ B25J 15/022; B25J 15/12
See application file for complete search history.

(56) References Cited

U.S. PATENT DOCUMENTS

| 4,452,479 A | 6/1984 | Terai et al. |
| 5,863,086 A * | 1/1999 | Christenson ............... B65F 3/04 294/106 |

(Continued)

FOREIGN PATENT DOCUMENTS

| CN | 204725506 U | 10/2015 |
| CN | 204748643 U | 11/2015 |

(Continued)

OTHER PUBLICATIONS

Qiuping Li, et. al. "Grasping force study of underactuated and flexible manipulator", Light Industry Machinery, vol. 36, No. 3, Jun. 2018.

*Primary Examiner* — Stephen A Vu
(74) *Attorney, Agent, or Firm* — IPro, PLLC (57) ABSTRACT

The disclosure relates to a mechanical hand of a dual-driven special-shaped super-flexible elastic framework. The mechanical hand includes a top plate and a base plate. The top plate and the base plate are fixed into a whole through two groups of guide connection rods. Two lead screw shaft servo motors are disposed on the top plate at an interval. Lead screws of the two lead screw shaft servo motors are respectively connected to a hollow finger front section driving plate and a finger root portion driving plate. Tail ends of the two lead screws are respectively supported on the base plate through two mounted bearings. The mechanical hand further includes flexible fingers. A tip portion of each of the flexible fingers is fixed on the hollow finger front section driving plate. A special-shaped super-flexible leaf spring of the flexible finger is connected to the base plate through a finger root hinge seat. A curved rod of the flexible finger is connected to the finger root portion driving plate through a curved rod hinge seat. The two lead screw shaft servo motors convert rotation movements into linear movements through lead screw nut mechanisms, and different portions of the (Continued)

flexible finger are respectively driven to move. Objects of different sizes and states are reliably grasped. A grasping range is wide. A flexible self-adaption effect is achieved.

5 Claims, 8 Drawing Sheets

(56) References Cited

U.S. PATENT DOCUMENTS

| | | | |
|---|---|---|---|
| 6,398,282 B1 * | 6/2002 | Mononen | B66C 3/16 |
| | | | 294/106 |
| 8,807,613 B2 * | 8/2014 | Howell | B65F 3/04 |
| | | | 294/106 |
| 9,724,832 B2 * | 8/2017 | Zhang | B25J 15/022 |
| 9,790,059 B2 * | 10/2017 | Grant | B66C 3/04 |

FOREIGN PATENT DOCUMENTS

| | | | |
|---|---|---|---|
| CN | 108436952 A | | 8/2018 |
| CN | 108858271 A | | 11/2018 |
| CN | 109079833 A | | 12/2018 |
| DE | 3710296 C2 | | 6/1989 |

\* cited by examiner

MECHANICAL HAND OF DUAL-DRIVEN SPECIAL-SHAPED SUPER-FLEXIBLE ELASTIC FRAMEWORK

TECHNICAL FIELD

The disclosure relates to connection with a robot body in the technical field of application of robots and mechatronics, and particularly relates to a mechanical hand of a dual-driven special-shaped super-flexible elastic framework.

BACKGROUND

In view of large-scale production conditions of light industry and food industry, tail end grasping devices for logistics grasping are needed for satisfying the logistics and packaging demands of raw materials, semi-finished products and finished products with complicated shapes and diverse physical properties and solving the problems of high labor cost, poor labor conditions and the like of simple work. The types of complicated objects to be grasped include: (1) objects (melons, fruits and vegetables) with irregular shapes and great size differences; (2) fragile brittle objects (eggs and glass-ceramic products); (3) easy-to-deform soft objects (bread and soft packaging objects); and (4) special-shaped objects (wine bottles and cosmetic bottles) which are disordered in position states and are difficult to tidy. From the above, it can be seen that the complicated objects have great differences in material properties, shape sizes and positional states. A traditional industrial mechanical hand (a tail end grasping device is of a clamp type or parallel moving type structure) can only grasp rigid workpieces which have the same shape and size and consistent position states and cannot be damaged. A humanoid dexterous hand needs to sense the spatial position and the shape of the complicated object, and needs to accurately control the movements and the grasping force, otherwise the complicated object will be damaged or cannot be reliably grasped. However, at present, the humanoid dexterous hand is still at a laboratory research stage.

At present, a finger portion of an under-actuated mechanical hand is of a rigid variable constraint structure, and each finger has three freedom degrees. Under the drive of a single motor, when the finger is not in contact with the object to be grasped, movement tracks of any one point of the finger are constant and will interfere with a small support surface of the object to be grasped (such as a conveying belt). When the finger is in contact with the object to be grasped, the elasticity of a special-shaped super-flexible leaf spring 4a needs to be overcome, and the acting point and the magnitude and the direction of its acting force cannot be changed. The adaption to the inconstant shapes and sizes of the above complicated objects to be grasped cannot be realized, the special requirements that no damage is caused by the contact force, and the complicated objects are reliably grasped cannot be met, and at the same time, great impact can be caused to the grasped complicated objects. Therefore, the under-actuated mechanical hand of a rigid structure has poor adaptability, and cannot effectively grasp the above-mentioned complicated objects.

SUMMARY

In view of the defects in the existing production technology, the applicant mainly aims at the above complicated objects to be grasped to provide a reasonable-structure mechanical hand of a dual-driven special-shaped super-flexible elastic framework. The mechanical hand reliably grasps objects in an enveloping manner so as to adapt to the dimension change of the objects, or the special-shaped super-flexible elastic framework is directly driven so that a tail end generates elastic deformation, and the objects are reliably grasped in a pinched manner. By changing installation positions of fingers, the mechanical hand also adapts to vertical grasping of cylindrical, square, spherical and ellipsoidal objects, or horizontal grasping of cylindrical and square objects. Through angular displacement control by a motor with an angular displacement feedback encoder, the grasping posture is adjustable, and the acting point of contact force is adjustable, so that during grasping of complicated objects, the grasping range is wide. A flexible self-adaption grasping effect is achieved.

The disclosure adopts the following technical solution:

A mechanical hand of a dual-driven special-shaped super-flexible elastic framework includes a top plate and a base plate. Two lead screw shaft servo motors are disposed on the top plate at an interval. Lead screws of the two lead screw shaft servo motors are respectively connected to a hollow finger front section driving plate and a finger root portion driving plate through lead screw nut seats. Tail ends of the two lead screws are respectively supported on the base plate through two mounted bearings. The top plate and the base plate are fixed into a whole through two groups of guide connection rods. Each group of guide connection rods includes two guide connection rods. Two linear bearings are disposed on each of the hollow finger front section driving plate and the finger root portion driving plate. One group of guide connection rods respectively passes through the two linear bearings positioned on the hollow finger front section driving plate, and the other group of guide connection rods respectively passes through the two linear bearings positioned on the finger root portion driving plate. The mechanical hand further includes flexible fingers. Each of the flexible fingers has an installation structure that a T-shaped groove plate is included. Two T-shaped grooves are formed in the T-shaped groove plate at an interval. A lower end of an upper rod and an upper end of a lower rod are respectively connected into the two T-shaped grooves. An upper end of the upper rod is fixedly connected to the hollow finger front section driving plate through a screw nut. A lower end of the lower rod is hinged to a special-shaped super-flexible leaf spring. The special-shaped super-flexible leaf spring consists of a vertical section and a curved section. Connecting members are fixedly disposed at two sides of the head end and tail end outer walls of the vertical section. The connecting member at the tail end is hinged to the lower end of the lower rod. The connecting member at the head end is connected to a special-shaped plate and a finger root hinge seat. The finger root hinge seat and the base plate are connected. The special-shaped plate is hinged to the finger root portion driving plate through a curved rod. The two lead screw shaft servo motors respectively drive the finger root portion driving plate and the hollow finger front section driving plate through respective lead screws, and do vertical linear movements through being guided by the two groups of guide connection rods respectively connected to the two lead screw shaft servo motors.

As further improvement of the above technical solution:

A cross section of the vertical section of the special-shaped super-flexible leaf spring is in a hyperbolic parabola shape. A cross section of the curved section is in an elliptical shape, and is ended at the tail end by a cross section vertical to an axis of the ellipse. The connecting member at the tail end of the vertical section is of a fan-shaped structure, and is hinged to the lower end of the lower rod in a circle center position of the fan-shaped structure. Two thick washers are disposed between the lower rod and the connecting member at the tail end of the vertical section of the special-shaped super-flexible leaf spring in a hinging position. A thick washer and a thin washer are disposed in a connecting position between the special-shaped plate and the connecting member at the head end of the vertical section. One end of the finger root hinge seat is hinged between the thin washer and the special-shaped plate.

The special-shaped plate is of a triangular structure. One edge of the triangular structure is in an inwards recessed circular arc shape. Two vertex positions of the triangular structure are respectively and fixedly connected to the connecting member at the head end of the vertical section of the special-shaped super-flexible leaf spring through two pins. Another vertex of the triangular structure is hinged to one end of the curved rod. The curved rod is in a curved shape, and additionally, the other end of the curved rod is hinged to a curved rod hinge seat disposed on the finger root portion driving plate.

The curved rod hinge seat is positioned and moves in the T-shaped grooves formed in the finger root portion driving plate, and is fixed through screws.

The lower end of the upper rod and the upper end of the lower rod respectively slide along the T-shaped grooves of the T-shaped groove plate so as to regulate a length, and are tightly locked by screw nuts.

Three flexible fingers are disposed. The three flexible fingers are uniformly distributed along the circumference in a spatial position or are distributed on three vertexes of an isosceles triangle. One of the flexible fingers is positioned on a vertex angle of the isosceles triangle, and the other two flexible fingers are respectively positioned on two bottom angles of the isosceles triangle. A circle passing through the vertex of the isosceles triangle and being tangent to the bottom edge of the isosceles triangle is concentric with a circle uniformly distributed along the circumference, so that an origin of coordinates is enabled to be unchanged when the mechanical hand is used for vertically grasping round objects or square objects.

A middle portion of the hollow finger front section driving plate is of a hollow structure. The hollow position allows an upper portion of the curved rod and the finger root portion driving plate to pass.

The top plate is of a T-shaped structure. Two positioning holes are formed along a symmetry axis of the T-shaped structure at an interval. One positioning hole is formed in each of the two symmetrical ends of the T-shaped structure at two sides of the symmetry axis. Upper ends of the four guide connection rods are respectively fixed in the four positioning holes. Positioning holes coaxial with the four positioning holes are formed in corresponding positions on the base plate, and are provided for fixing lower ends of the guide connection rods. The upper and lower ends of the four guide connection rods are respectively in clearance fit with the eight positioning holes through cylindrical surfaces, and the top plate and the base plate are fixed into a whole through screw nuts. The two mounted bearings respectively provide support at the tail ends of the lead screws of the two lead screw shaft servo motors.

Two coaxial through holes are formed in each of the hollow finger front section driving plate and the finger root portion driving plate, corresponding two of the four guide connection rods respectively pass through the coaxial through holes, and the hollow finger front section driving plate and the finger root portion driving plate are respectively guided by the two guide connection rods and driven by one lead screw shaft servo motor. The four through holes are respectively fit with the four linear bearings.

The special-shaped super-flexible leaf spring uses a spring steel material.

The disclosure has the following beneficial effects:

The structure of the disclosure is compact and reasonable, and the operation is convenient. The two servo motors convert rotation movements into linear movements through lead screw nut mechanisms, and the three fingers are driven to work. One servo motor directly drives root portions of the special-shaped super-flexible elastic framework of three finger components to rotate so as to adapt to the object size change. The other servo motor directly drives a middle section of the special-shaped super-flexible elastic framework of three finger components to generate elastic deformation so as to reliably grasp objects in an enveloping manner, or directly drives the special-shaped super-flexible elastic framework to enable the tail end to generate elastic deformation so as to reliably grasp the objects in a pinching manner. By changing the installation positions of the fingers, the mechanical hand also adapts to vertical grasping of cylindrical, square, spherical and ellipsoidal objects, or horizontal grasping of cylindrical and square objects. Through angular displacement control by a motor with an angular displacement feedback encoder, the grasping posture is adjustable, and the acting point of contact force is adjustable, so that during grasping of complicated objects, the grasping range is wider. The double servo motors directly drive the special-shaped super-flexible elastic framework, and a flexible self-adaption grasping effect is generated through structure flexibility. Meanwhile, the disclosure also has the following advantages:

(1) Through the control by the servo motors, a rotation angle of the special-shaped super-flexible leaf spring and the finger root hinge seat and an angle of a grasped object can be regulated, regulation on a contact point position is realized. For the regulation on the contact point position of the grasped object, the acting point of the contact force and the direction of the acting force can be selected according to conditions, so that deformation and damage to the object in the grasping process are avoided, and the grasping is more precise and reliable. Meanwhile, by regulating the rotation angle of the special-shaped super-flexible leaf spring and the curved rod and the angle of the grasped object, adaption to great change of the size of the grasped object can be realized, and the adaption to the vertical grasping of the cylindrical, spherical and square objects or horizontal grasping of cylindrical and square objects is realized.

(2) Through the driving control by the other servo motor, the elastic deformation of the middle section (vertical section) of the special-shaped super-flexible leaf spring is overcome, so that the objects are reliably grasped in an enveloping manner. A flexible self-adaptation effect is achieved on the acting point and magnitude of the grasping force at the middle section and the tail end (curved section) of the special-shaped super-flexible leaf spring.

(3) Or, through the driving control by the other servo motor, the elastic deformation of the middle section (vertical section) of the special-shaped super-flexible leaf spring is overcome, and the tail end (curved section) of the special-shaped super-flexible leaf spring is enabled to generate elastic deformation, so that the objects are reliably grasped in a pinched manner. A flexible self-adaptation effect is achieved on the acting point and magnitude of the grasping force at the tail end of the special-shaped super-flexible elastic framework.

In the figures, 1 denotes a lead screw shaft servo motor; 2 denotes a top plate; 3 denotes a guide connection rod; 4 denotes a hollow finger front section driving plate; 5 denotes a lead screw nut seat; 6 denotes a curved rod hinge seat; 7 denotes a finger root portion driving plate; 8 denotes a linear bearing; 9 denotes a finger root hinge seat; 10 denotes a base plate; 11 denotes a mounted bearing; 12 denotes a flexible finger; 1a denotes an upper rod; 2a denotes a T-shaped groove plate; 3a denotes a lower rod; 4a denotes a special-shaped flexible leaf spring; 5a denotes a special-shaped plate; 6a denotes a curved rod; 7a denotes a thick washer; and 8a denotes a thin washer.

DETAILED DESCRIPTION

Specific implementations of the disclosure will be illustrated with reference to drawings hereafter.

As shown in FIGS. 1-4, FIGS. 5-8 and FIGS. 9-26, a mechanical hand of a dual-driven special-shaped super-flexible elastic framework according to the present example includes a top plate 2 and a base plate 10. Two lead screw shaft servo motors 1 are disposed on the top plate 2 at an interval. Lead screws of the two lead screw shaft servo motors 1 are respectively connected to a hollow finger front section driving plate 4 and a finger root portion driving plate 7 through lead screw nut seats 5. Tail ends of the two lead screws are respectively supported on the base plate 10 through two mounted bearings 11. The top plate 2 and the base plate 10 are fixed into a whole through two groups of guide connection rods 3. Each group of guide connection rods 3 includes two guide connection rods 3. Two linear bearings 8 are disposed on each of the hollow finger front section driving plate 4 and the finger root portion driving plate 7. One group of guide connection rods 3 respectively passes through the two linear bearings 8 positioned on the hollow finger front section driving plate 4, and the other group of guide connection rods 3 respectively passes through the two linear bearings 8 positioned on the finger root portion driving plate 7. The mechanical hand further includes flexible fingers 12. Each of the flexible fingers 12 has an installation structure that a T-shaped groove plate 2a is included. Two T-shaped grooves are formed in the T-shaped groove plate 2a at an interval. A lower end of an upper rod 1a and an upper end of a lower rod 3a are respectively connected into the two T-shaped grooves. An upper end of the upper rod 1a is fixedly connected to the hollow finger front section driving plate 4 through a screw nut. A lower end of the lower rod 3a is hinged to a special-shaped super-flexible leaf spring 4a. The special-shaped super-flexible leaf spring 4a consists of a vertical section and a curved section. Connecting members are fixedly disposed and positioned at two sides of the head end and tail end outer walls of the vertical section. The connecting member at the tail end is hinged to the lower end of the lower rod 3a. The connecting member at the head end is connected to a special-shaped plate 5a and a finger root hinge seat 9. The finger root hinge seat 9 and the base plate 10 are connected. The special-shaped plate 5a is hinged to the finger root portion driving plate 7 through a curved rod 6a. The two lead screw shaft servo motors 1 respectively drive the finger root portion driving plate 7 and the hollow finger front section driving plate 4 through respective lead screws, and do vertical linear movements through being guided by the two groups of guide connection rods 3 respectively connected to the two lead screw shaft servo motors.

Figure 19:
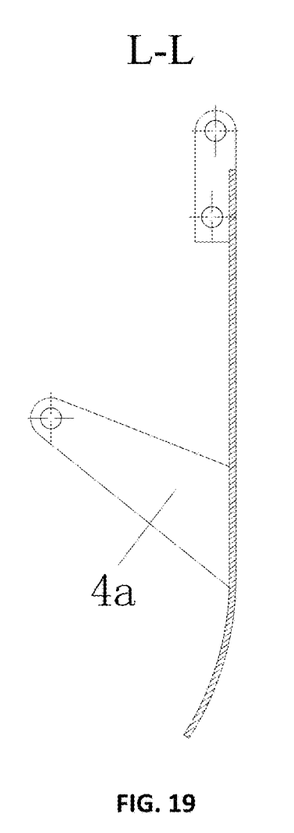
FIG. 19 is an L-L section view in FIG. 20.
Figure 20:
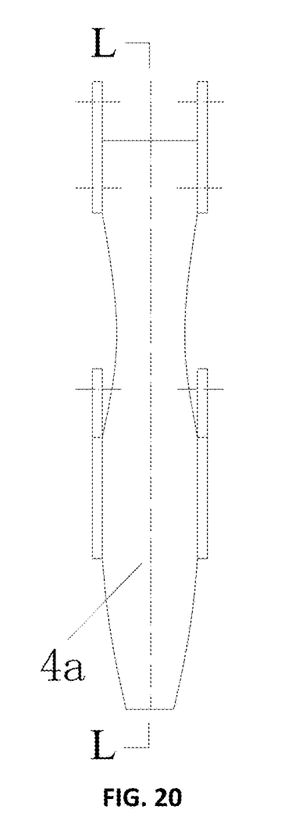
FIG. 20 is a left view of a special-shaped super-flexible leaf spring of the disclosure.
Figure 21:
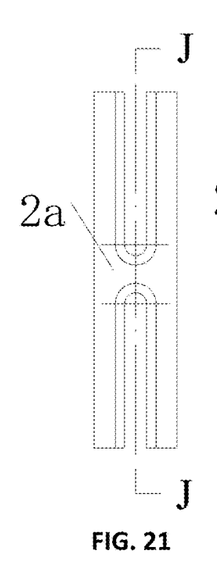
FIG. 21 is a main view of a T-shaped groove plate of the disclosure.
Figure 22:
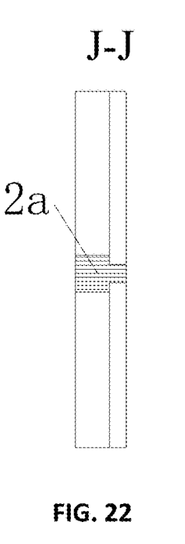
FIG. 22 is a J-J section view in FIG. 21.

As shown in FIGS. 19 and 20, a cross section of the vertical section of the special-shaped super-flexible leaf spring 4a is in a hyperbolic parabola shape. A cross section of the curved section is in an elliptical shape, and is ended at the tail end by a cross section vertical to an axis of the ellipse. The connecting member at the tail end of the vertical section is of a fan-shaped structure, and is hinged to the lower end of the lower rod 3a in a circle center position of the fan-shaped structure. Two thick washers 7a are disposed between the lower rod 3a and the connecting member at the tail end of the vertical section of the special-shaped super-flexible leaf spring 4a in a hinging position. A thick washer 7a and a thin washer 8a are disposed in a connecting position between the special-shaped plate 5a and the connecting member at the head end of the vertical section. One end of the finger root hinge seat 9 is hinged between the thin washer 8a and the special-shaped plate 5a.

Figure 23:
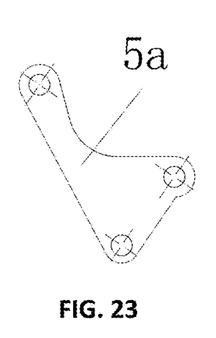
FIG. 23 is a main view of a special-shaped plate of the disclosure.
Figure 24:
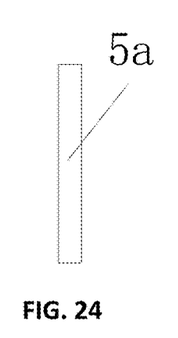
FIG. 24 is a left view of the special-shaped plate of the disclosure.
Figure 25:
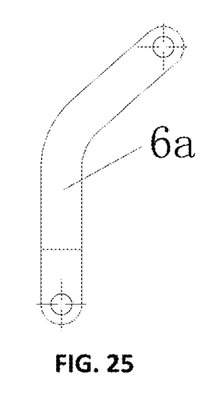
FIG. 25 is a main view of a curved rod of the disclosure.
Figure 26:
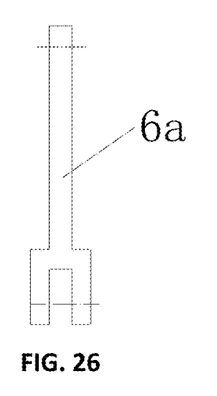
FIG. 26 is a left view of the curved rod of the disclosure.

As shown in FIGS. 23 and 24, the special-shaped plate 5a is of a triangular structure. One edge of the triangular structure is in an inwards recessed circular arc shape. Two vertex positions of the triangular structure are respectively and fixedly connected to the connecting member at the head end of the vertical section of the special-shaped super-flexible leaf spring 4a through two pins. Another vertex of the triangular structure is hinged to one end of the curved rod 6a. The curved rod 6a is in a curved shape, and additionally, the other end of the curved rod is hinged to a curved rod hinge seat 6 disposed on the finger root portion driving plate 7.

Figure 2:
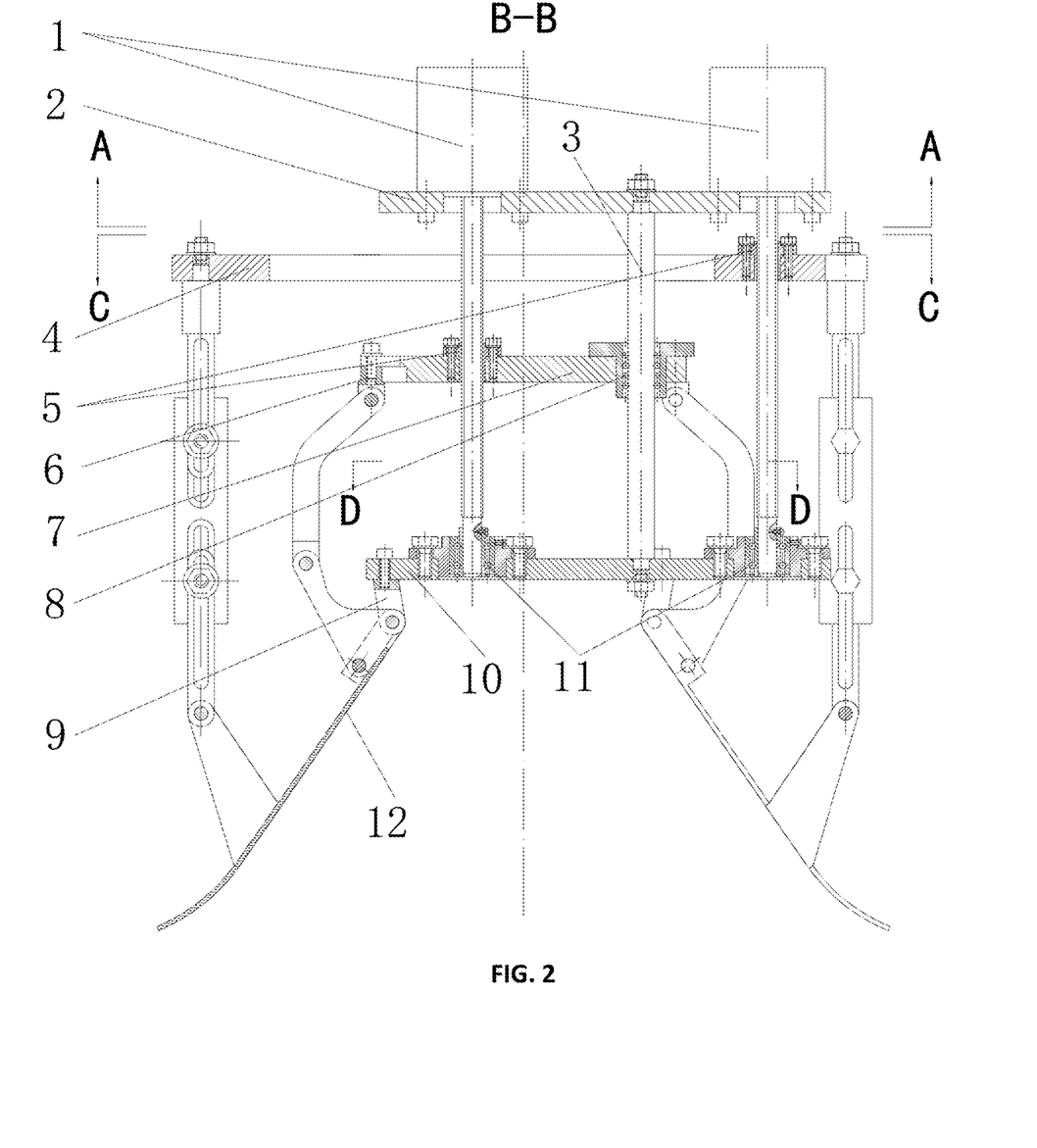
FIG. 2 is a main view of a B-B section of the disclosure (full section view of the disclosure).
Figure 3:
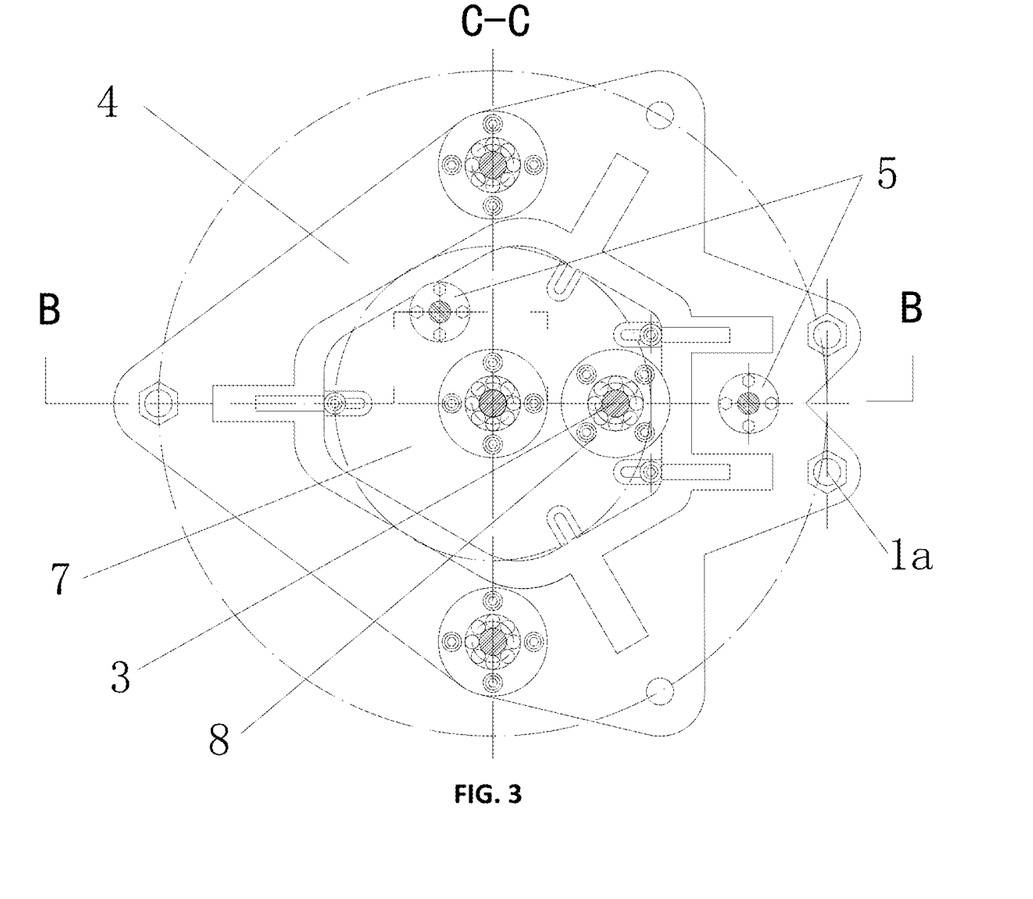
FIG. 3 is a top view of a C-C section in FIG. 2.
Figure 13:
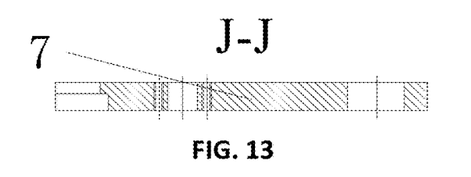
FIG. 13 is a J-J section view in FIG. 14.
Figure 14:
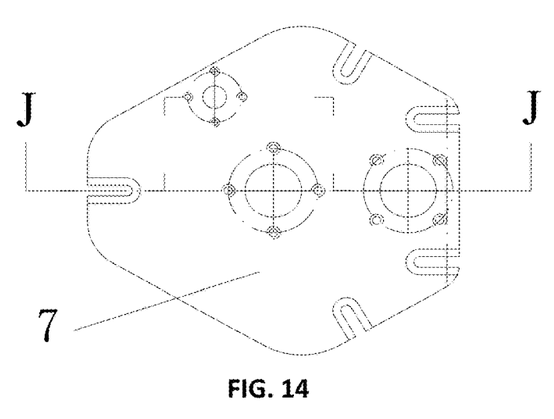
FIG. 14 is a top view of a finger root portion driving plate of the disclosure.
Figure 15:
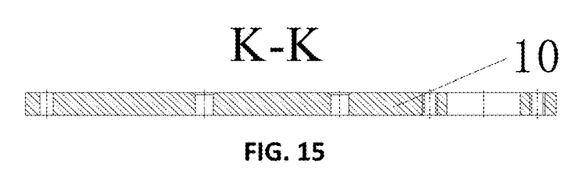
FIG. 15 is a K-K section view in FIG. 16.
Figure 16:
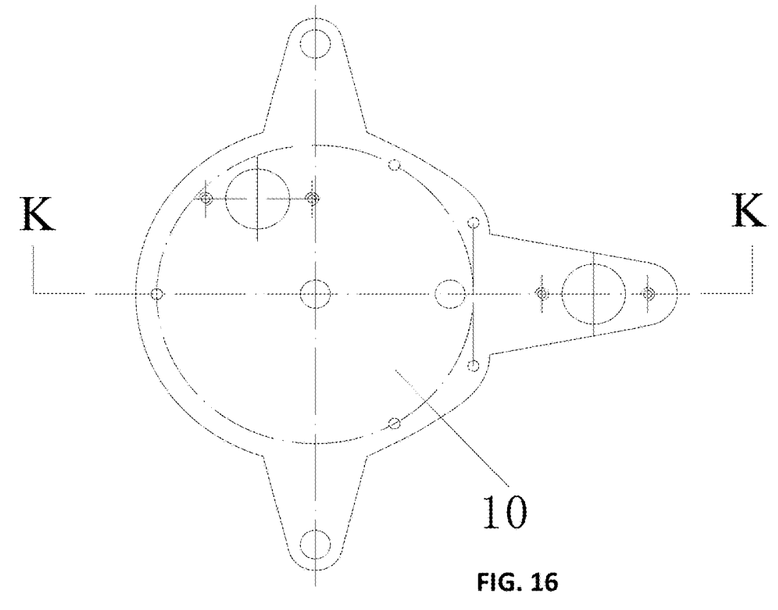
FIG. 16 is a top view of a base plate part of the disclosure.
Figure 17:
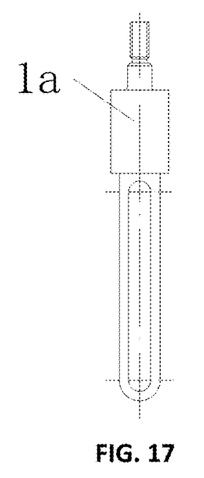
FIG. 17 is a main view of an upper rod of the disclosure.
Figure 18:
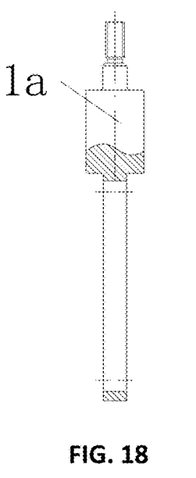
FIG. 18 is a left view of the upper rod of the disclosure.

As shown in FIGS. 2, 13 and 14, the curved rod hinge seat 6 is positioned and moves in the T-shaped grooves formed in the finger root portion driving plate 7, and is fixed through screws.

As shown in FIGS. 2, 17, 18, 21 and 22, the lower end of the upper rod 1a and the upper end of the lower rod 3a respectively slide along the T-shaped grooves of the T-shaped groove plate 2a so as to regulate a length, and are tightly locked by screw nuts.

As shown in FIGS. 2, 3, 4 and 12, three flexible fingers 12 are disposed. The three flexible fingers 12 are uniformly distributed along the circumference in a spatial position or are distributed on three vertexes of an isosceles triangle. One of the flexible fingers 12 is positioned on a vertex angle of the isosceles triangle, and the other two flexible fingers 12 are respectively positioned on two bottom angles of the isosceles triangle. A circle passing through the vertex of the isosceles triangle and being tangent to the bottom edge of the isosceles triangle is concentric with a circle uniformly distributed along the circumference, so that an origin of coordinates is enabled to be unchanged when the mechanical hand is used for vertically grasping round objects or square objects.

As shown in FIGS. 2, 11, 12, 13 and 14, a middle portion of the hollow finger front section driving plate 4 is of a hollow structure. The hollow position allows an upper portion of the curved rod 6a and the finger root portion driving plate 7 to pass.

Two coaxial through holes are formed in each of the hollow finger front section driving plate 4 and the finger root portion driving plate 7, corresponding two of the four guide connection rods 3 respectively pass through the coaxial through holes, and the hollow finger front section driving plate 4 and the finger root portion driving plate 7 are respectively guided by the two guide connection rods 3 and driven by one lead screw shaft servo motor 1. The four through holes are respectively fit with the four linear bearings 8.

Figure 1:
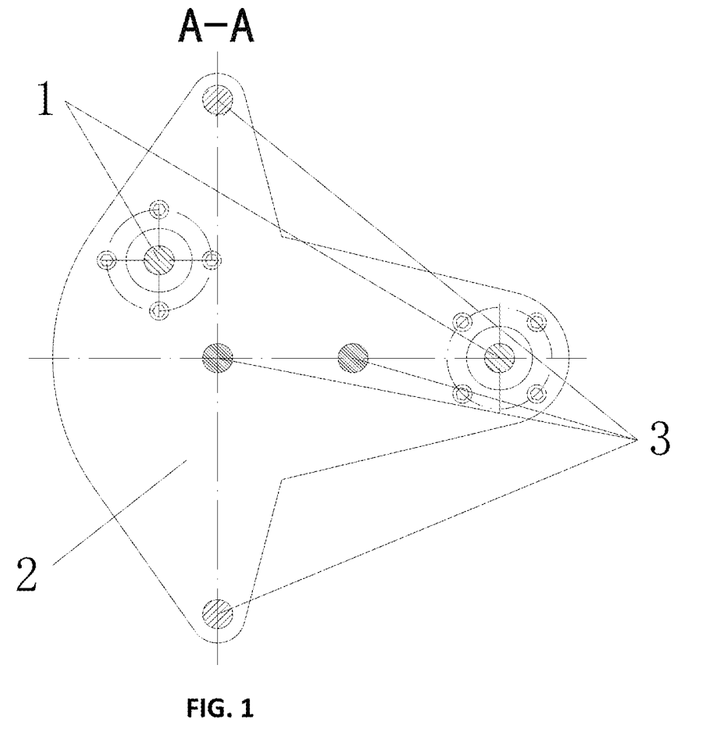
FIG. 1 is a bottom view of an A-A section in FIG. 2.
Figure 4:
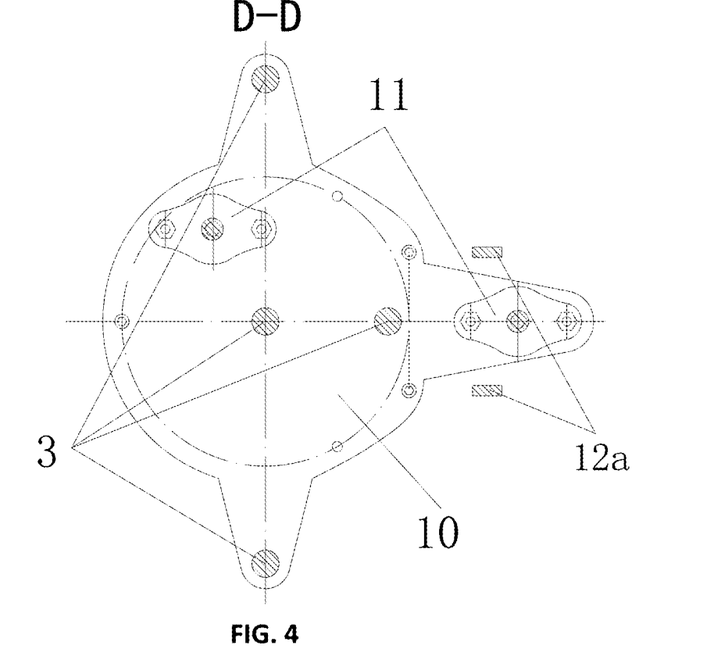
FIG. 4 is a top view of a D-D section in FIG. 2.
Figure 5:
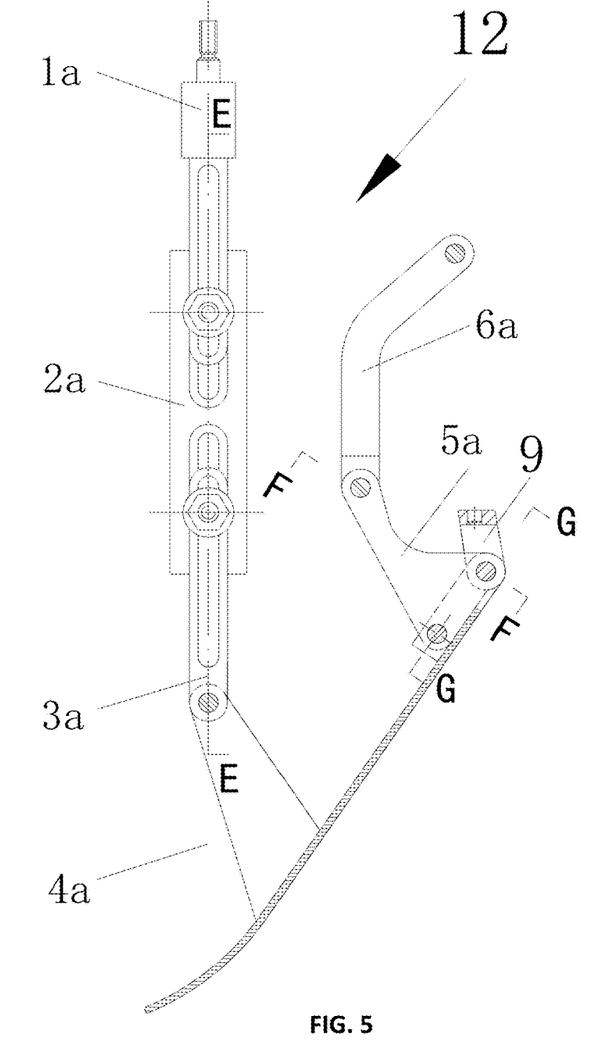
FIG. 5 is a main view of a flexible finger of the disclosure.

As shown in FIGS. 1 and 4, the top plate 2 is of a T-shaped structure. Two positioning holes are formed along a symmetry axis of the T-shaped structure at an interval. One positioning hole is formed in each of the two symmetrical ends of the T-shaped structure at two sides of the symmetry axis. Upper ends of the four guide connection rods 3 are respectively fixed in the four positioning holes. Positioning holes coaxial with the four positioning holes are formed in corresponding positions on the base plate 10, and are provided for fixing lower ends of the guide connection rods 3. The upper and lower ends of the four guide connection rods 3 are respectively in clearance fit with the eight positioning holes through cylindrical surfaces, and the top plate 2 and the base plate 10 are fixed into a whole through screw nuts. The two mounted bearings 11 respectively provide support at the tail ends of the lead screws of the two lead screw shaft servo motors 1.

The special-shaped super-flexible leaf spring 4a uses a spring steel material.

The present example has the following installation principle:

As shown in FIGS. 1-4, the two lead screw shaft servo motors 1 are fixed onto the top plate 2. A lead screw nut seat 5 and two linear bearings 8 are disposed on each of the hollow finger front section driving plate 4 and the finger root portion driving plate 7. One lead screw shaft servo motor 1 drives the hollow finger front section driving plate 4, and the other lead screw shaft servo motor 1 drives the finger root portion driving plate 7. The hollow finger front section driving plate 4 and the finger root portion driving plate 7 respectively do linear movements through the two linear bearings 8 through being guided by the guide connection rods 3. The middle portion of the hollow finger front section driving plate 4 is hollow, so that the finger root portion driving plate 7 can be positioned above the hollow finger front section driving plate 4, and can also be positioned under the hollow finger front section driving plate 4. The two mounted bearings 11 are separately disposed on the base plate 10 and are configured to support the lead screws of the two lead screw shaft servo motors 1. A positioning hole of one lead screw shaft servo motor 1 on the top plate 2, a positioning hole of the lead screw nut seat 5 on the hollow finger front section driving plate 4 and a positioning hole of one mounted bearing 11 on the base plate 10 are enabled to be coaxial. A positioning hole of the other lead screw shaft servo motor 1 on the top plate 2, a positioning hole of the lead screw nut seat 5 on the finger root portion driving plate 7 and a positioning hole of the other mounted bearing 11 on the base plate 10 are enabled to be coaxial. Positioning holes of the four guide connection rods 3 on the top plate 2 and the base plate 10 are enabled to be coaxial. Cylindrical surfaces are respectively formed on the upper and lower ends of the four guide connection rods 3 and are in clearance fit with the eight positioning holes. The top plate 2 and the base plate 10 are fixed into a whole by the four guide connection rods 3.

Figure 7:
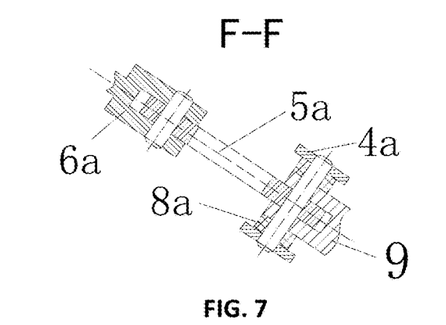
FIG. 7 is an F-F local section view in FIG. 5.

The installation of the three flexible fingers 12 can be round uniformly distributed installation, and can also be in a mode that one flexible finger 12 is symmetrical to the middle of the two flexible fingers 12 on the other parallel plane. The upper rod 1a on the flexible finger 12 is fixed onto the hollow finger front section driving plate 4 through a screw nut. One end of a curved rod 6a of the flexible finger 12 is hinged and connected to the curved rod hinge seat 6. The curved rod hinge seat 6 can be positioned and move in the T-shaped groove on the finger root portion driving plate 7, and is fixed through screws. As shown in FIG. 7, the special-shaped super-flexible leaf spring 4a, the thin washer 8a, the finger root hinge seat 9 and the special-shaped plate 5a are respectively disposed from outside to inside, and these four kinds of parts form hinge connection through cylindrical pins.

Figure 6:
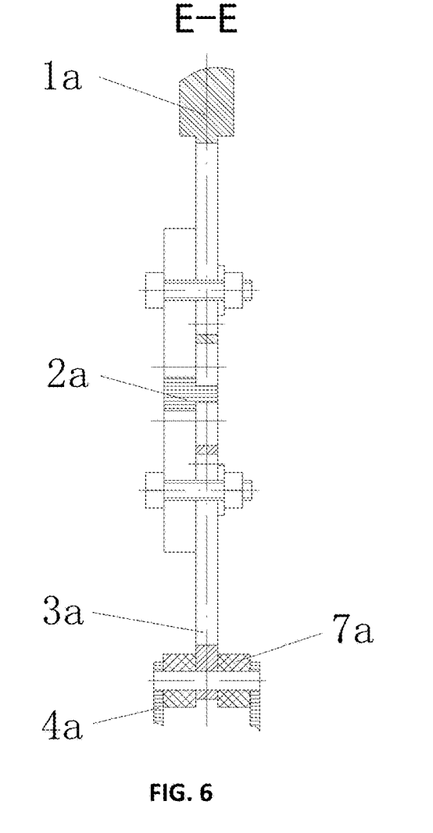
FIG. 6 is an E-E local section view in FIG. 5.
Figure 8:
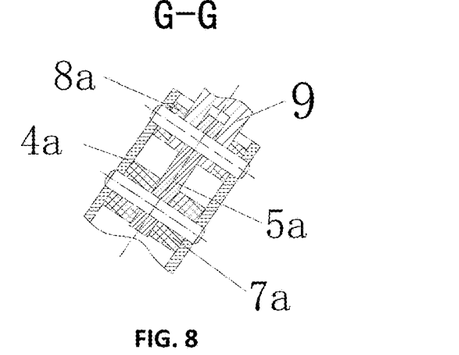
FIG. 8 is a G-G local section view in FIG. 5.
Figure 9:
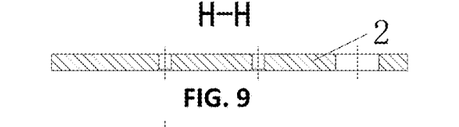
FIG. 9 is an H-H section view in FIG. 10.
Figure 10:
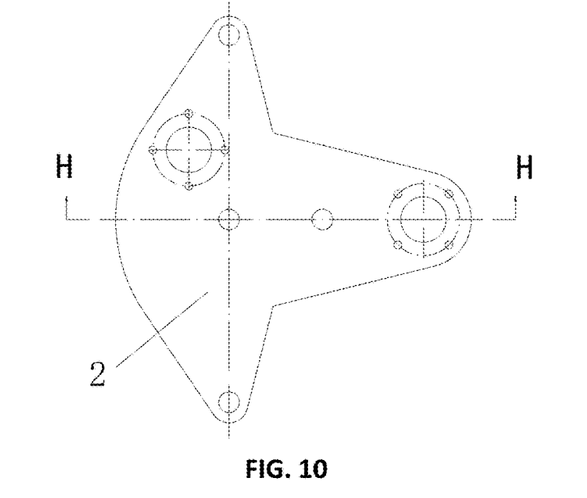
FIG. 10 is a top view of a top plate part of the disclosure.
Figure 11:
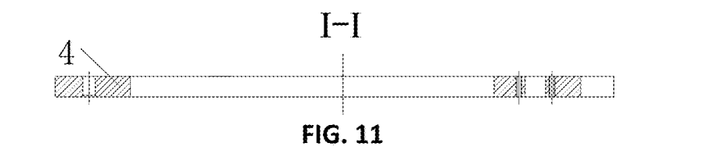
FIG. 11 is an I-I section view in FIG. 12.
Figure 12:
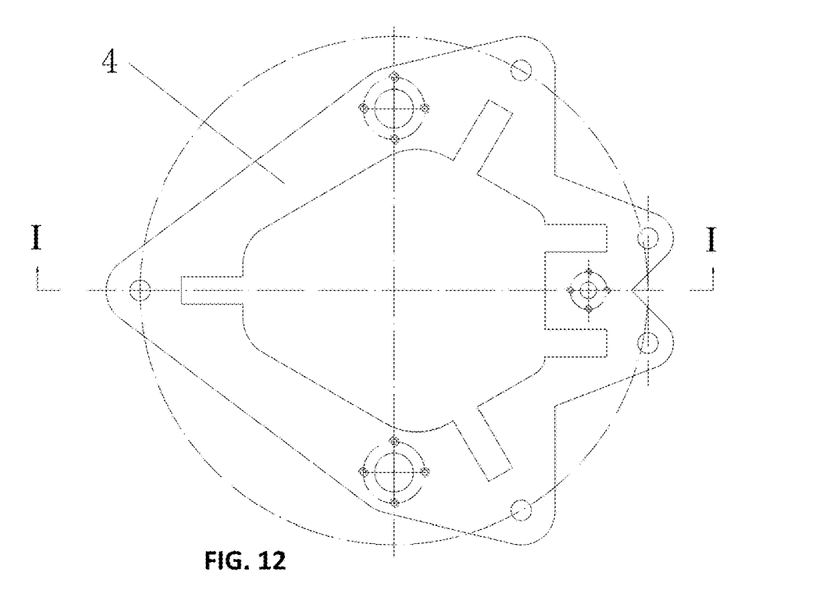
FIG. 12 is a top view of a hollow finger front section driving plate of the disclosure.

As shown in FIGS. 5-8, in flexible finger 12 components, three parts including the upper rod 1a, the T-shaped groove plate 2a and the lower rod 3a are connected through screw threads. The upper rod 1a and the lower rod 3a are respectively guided by the T-shaped grooves of the T-shaped groove plates 2a, and are then tightly locked by screw nuts, and the length can be regulated. As shown in FIG. 6, the lower end of the lower rod 3a forms hinge connection with the special-shaped super-flexible leaf spring 4a and the two thick washers 7a. As shown in FIG. 8, the special-shaped super-flexible leaf spring 4a, the thin washer 8a, the finger root hinge seat 9 and the special-shaped plate 5a are respectively disposed from outside to inside, and these four kinds of parts form hinge connection through cylindrical pins. The thick washer 7a is disposed between the special-shaped super-flexible leaf spring 4a and the special-shaped plate 5a, and these three kinds of parts are fixed by pins, so that the special-shaped super-flexible leaf spring 4a and the special-shaped plate 5a form a whole structure. The special-shaped plate 5a and the curved rod 6a are in hinge connection, the curved rod 6a pushes the special-shaped plate 5a, so that the special-shaped super-flexible leaf spring 4a generates elastic deformation. As an elastic deformation part, the special-shaped super-flexible leaf spring 4a playing a key role in the flexible finger 12 component uses a spring steel material.

In the present example, one lead screw shaft servo motor 1 drives the hollow finger front section driving plate 4 to do vertical linear movements, so that the special-shaped super-flexible leaf spring 4a generates elastic deformation, and a grasping effect is achieved.

In the present example, the other lead screw shaft servo motor 1 drives the finer root portion driving plate 7 to do vertical linear movement, and the curved rod 6a is driven to regulate an included angle between the special-shaped super-flexible leaf spring 4a and the base plate 10.

In the present example, the curved rod hinge seat 6 can be positioned and move in the T-shaped groove on the finger root portion driving plate 7 and is fixed through screws. The position of the curved rod hinge seat 6 on the finger root portion driving plate 7 can be regulated, so that the initial state of the flexible finger 12 is regulated.

In the present example, the upper rod 1a and the lower rod 3a are respectively guided by the T-shaped grooves of the T-shaped groove plate 2a, and are then tightly locked by screw nuts, and the length can be regulated, so that the initial state of the flexible finger 12 is regulated.

In the present example, the installation of the three flexible fingers 12 can be round uniformly distributed installation, so as to realize vertical grasping and vertical listing of cylinders or spheres. The installation of the three flexible fingers can also be in a mode that one flexible finger 12 is symmetrical to the middle of the two flexible fingers 12 on the other parallel plane, so as to realize vertical grasping of rectangles or cylinders with horizontal axial lines.

The disclosure has the following work principle and use flow process: After optimized calculation on specific grasped objects, the special-shaped super-flexible leaf spring 4a is designed, the grasping posture and the contact point position corresponding to the required grasping force can be calculated, and the grasping posture and the contact point position are precisely and cooperatively controlled by the rotation angle of the two lead screw shaft servo motors 1. Specifically, (1) when the same type (such as apples) of complicated objects with inconstant shapes and sizes are grasped, by selecting the proper parameters of the special-shaped super-flexible leaf spring 4a and the finger structure sizes, the freedom degree adaptability, no damage and reliable grasping of this type of complicated objects can be realized; (2) when the same shape (for example, spheres such as apples, oranges and tangerines, or squares such as big and small square boxes) of same-shape complicated objects with the great shape and size changes are grasped, by selecting the proper parameters of the special-shaped super-flexible leaf spring 4a and the finger structure sizes, the freedom degree adaptability, no damage and reliable grasping of the complicated objects in the same shape can be realized; and (3) when different shapes (for example, spheres such as apples, oranges and tangerines, or squares such as small square boxes) of complicated objects with different shapes and sizes are grasped, by changing the installation positions of the two flexible fingers 12, the freedom degree adaptability, no damage and reliable grasping of the complicated objects in the different shape can be realized.

Due to the flexible finger structure, the mechanical hand has the following states: (1) a state of no-load movements of the fingers under the non-contact condition; (2) a zero-contact-force state after the contact; (3) a state that an object does not move after the contact, but the contact force is increased, the position of the acting point of the contact force and the direction of the contact force are changed; (4) a state that the object does not move after the contact, and the contact force is maximum; (5) a state that the object and the mechanical hand do grasping movement of acceleration displacement at the same time, the acting point position, the magnitude and the direction of the contact force change; (6) a state that the object and the mechanical hand do grasping movement of constant-speed displacement at the same time, the acting point position, the magnitude and the direction of the contact force change; (7) a state that the object and the mechanical hand do grasping movement of deceleration displacement at the same time, the acting point position, the magnitude and the direction of the contact force change; and (8) a state that the object and the mechanical hand are still and suspended.

As shown in FIG. 19, the special-shaped super-flexible leaf spring 4a of the flexible finger 12 is a core technology of the mechanical hand of the disclosure, and uses the spring steel material. The special-shaped super-flexible leaf spring 4a has the structure characteristic of special shape and super flexibility. The special shape is embodied as: the three parts including the finger root fixed installation structure of the special-shaped super-flexible leaf spring 4a (1), the driving installation structure in hinge connection to the lower rod 3a (2) and two sections of springs of the elastic deformation plate (3) are designed into an integral light-weight flexible framework. The super flexibility is embodied as: two sections of leaf springs at the fingertip and the finger root can easily generate elastic deformation, the grasping in a "pinching manner" at the fingertip section and the grasping in an "enveloping manner" at the finger root section can be easily realized. A design method of the special-shaped super-flexible leaf spring 4a is no known by technicians in the fields of mechanical hands and robots. The mechanical characteristics are that: in a state that the magnitude and the direction of the driving force and the grasping contact force continuously change, the elastic super-large deformation needs to be considered, and the material strength requirement also needs to be met. The technical effects are that: according to the characteristics of various grasped objects, the special-shaped super-flexible leaf spring 4a designed in a semi-customized manner realizes the grasping in the "pinching manner" at the fingertip section and the grasping in the "enveloping manner" at the finger root section, the grasping range is wide, and the contact force flexible self-adaptation effect is achieved.

The foregoing description is illustrative of the disclosure but is not intended to limit the disclosure. The scope of the disclosure is defined by the claims. Modifications in any form can be made within the protection scope of the disclosure.

What is claimed is:

1. A mechanical hand of a dual-driven special-shaped super-flexible elastic framework, comprising a top plate (2) and a base plate (10), wherein two lead screw shaft servo motors (1) are disposed on the top plate (2) at an interval, each of the two lead screw shaft servo motors (1) having a lead screw are connected to a hollow finger front section driving plate (4) and a finger root portion driving plate (7) through a lead screw nut seat (5), respectively, with a tail end on each of the two lead screws [are] is each separately supported on the base plate (10) through a mounted bearing (11), the top plate (2) and the base plate (10) are fixed to first and second groups of guide connection rods (3), each of said groups of guide connection rods (3) comprises two guide connection rods (3), two linear bearings (8) are disposed on each of the hollow finger front section driving plate (4) and the finger root portion driving plate (7), said first group of guide connection rods (3) passes through the two linear bearings (8) positioned on the hollow finger front section driving plate (4), respectively, and the second group of guide connection rods (3) passes through the two linear bearings (8) positioned on the finger root portion driving plate (7), respectively; wherein the mechanical hand further comprises flexible fingers (12), each of the flexible fingers (12) has an installation structure including a T-shaped groove plate (2a), two T-shaped grooves are formed in the T-shaped groove plate (2a) at an interval, a lower end of an upper rod (1a) and an upper end of a lower rod (3a) are connected into the two T-shaped grooves, respectively, an upper end of the upper rod (1a) is fixedly connected to the hollow finger front section driving plate (4) through a screw nut, a lower end of the lower rod (3a) is hinged to a special shaped super-flexible leaf spring (4a), the special-shaped super-flexible leaf spring (4a) consists of a vertical section and a curved section, connecting members are fixedly disposed at two sides of outer walls of a head end and a tail end of the vertical section, the connecting member at the tail end is hinged to the lower end of the lower rod (3a), the connecting member at the head end is connected to a special-shaped plate (5a) and a finger root hinge seat (9), the finger root hinge seat (9) and the base plate (10) are connected, the special-shaped plate (5a) is hinged to the finger root portion driving plate (7) through a curved rod (6a), and the two lead screw shaft servo motors (1) drive the finger root portion driving plate (7) and the hollow finger front section driving plate (4) through respective lead screws, respectively, and do vertical linear movements through being guided by the two groups of guide connection rods (3) that are connected to the two lead screw shaft servo motors, respectively; wherein a cross section of the vertical section of the special-shaped super-flexible leaf spring (4a) is in a hyperbolic parabola shape, a cross section of the curved section is in an elliptical shape, and is ended at the tail end by a cross section vertical to an axis of the ellipse, the connecting member at the tail end of the vertical section is of a fan-shaped structure, and is hinged to the lower end of the lower rod (3a) in a circle center position of the fan-shaped structure, and two thick washers (7a) are disposed between the lower rod (3a) and the connecting member at the tail end of the vertical section of the special-shaped super-flexible leaf spring (4a) in a hinging position; and a thick washer (7a) and a thin washer (8a) are disposed in a connecting position between the special-shaped plate (5a) and the connecting member at the head end of the vertical section, wherein one end of the finger root hinge seat (9) is hinged between the thin washer (8a) and the special-shaped plate (5a); wherein the special-shaped plate (5a) is of a triangular structure, one edge of the triangular structure is in an inwardly recessed circular arc shape, two vertex positions of the triangular structure are separately and fixedly connected to the connecting member at the head end of the vertical section of the special-shaped super-flexible leaf spring (4a) through two pins, another vertex of the triangular structure is hinged to one end of the curved rod (6a), the curved rod (6a) is in a curved shape, and the other end of the curved rod is hinged to a curved rod hinge seat (6) disposed on the finger root portion driving plate (7); wherein three flexible fingers (12) are disposed, the three flexible fingers (12) are uniformly distributed along a circumference in a spatial position or are distributed on three vertexes of an isosceles triangle, one of the flexible fingers (12) is positioned on a vertex angle of the isosceles triangle, and the other two flexible fingers (12) are positioned on two bottom angles of the isosceles triangle, respectively; and a circle passing through the vertex of the isosceles triangle and being tangent to a bottom edge of the isosceles triangle is concentric with a circle uniformly distributed along the circumference, so that an origin of coordinates is enabled to be unchanged when the mechanical hand is used for vertically grasping round objects or square objects; wherein a middle portion of the hollow finger front section driving plate (4) is of a hollow structure, and the hollow position allows an upper portion of the curved rod (6a) and the finger root portion driving plate (7) to pass; wherein two coaxial through holes are formed in each of the hollow finger front section driving plate (4) and the finger root portion driving plate (7), corresponding two of the four guide connection rods (3) pass through the coaxial through holes, respectively, and the hollow finger front section driving plate (4) and the finger root portion driving plate (7) are guided by the two guide connection rods (3), respectively, and driven by one of the lead screw shaft servo motors (1); and the four through holes are fit with the four linear bearings (8), respectively.

2. The mechanical hand of the dual-driven special-shaped super-flexible elastic framework according to claim 1, wherein the curved rod hinge seat (6) is positioned and moves in the T-shaped grooves formed in the finger root portion driving plate (7), and is fixed through screws.

3. The mechanical hand of the dual-driven special-shaped super-flexible elastic framework according to claim 1, wherein the lower end of the upper rod (1a) and the upper end of the lower rod (3a) slide along the T-shaped grooves of the T-shaped groove plate (2a), respectively, so as to regulate a length, and are tightly locked by screw nuts.

4. The mechanical hand of the dual-driven special-shaped super-flexible elastic framework according to claim 1, wherein the top plate (2) is of a T-shaped structure, two positioning holes are formed along a symmetry axis of the T-shaped structure at an interval, one positioning hole is formed in each of two symmetrical ends of the T-shaped structure at two sides of the symmetry axis, upper ends of the four guide connection rods (3) are fixed in the four positioning holes, respectively, positioning holes coaxial with the four positioning holes are formed in corresponding positions on the base plate (10), and are provided for fixing lower ends of the guide connection rods (3), the upper and lower ends of the four guide connection rods (3) are in clearance fit with the eight positioning holes through cylindrical surfaces, respectively, and the top plate (2) and the base plate (10) are fixed into a whole through screw nuts; and the two mounted bearings (11) provide support at the tail ends of the lead screws of the two lead screw shaft servo motors (1), respectively.

5. The mechanical hand of the dual-driven special-shaped super-flexible elastic framework according to claim 1, wherein the special-shaped super-flexible leaf spring (4a) uses a spring steel material.

* * * * *